Jan. 30, 1940.   F. H. WIRTZ   2,188,586
COUNTER CONSTRUCTION
Filed April 28, 1938   2 Sheets-Sheet 1
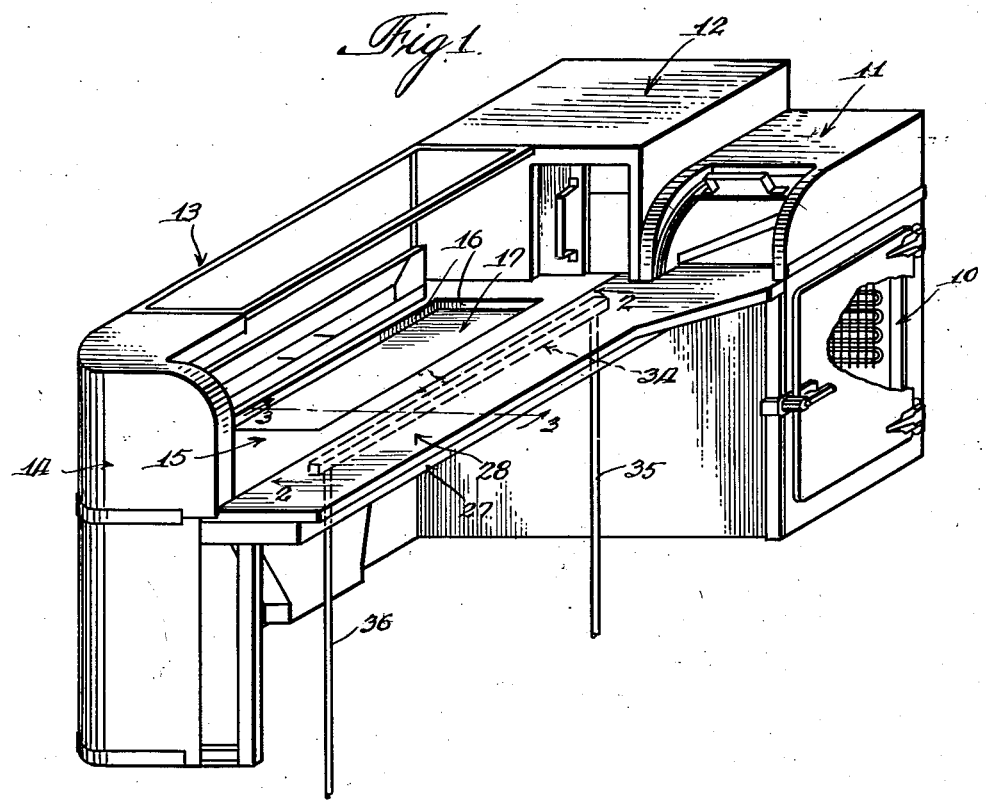
Franklin H Wirtz
INVENTOR
BY
ATTORNEYS.

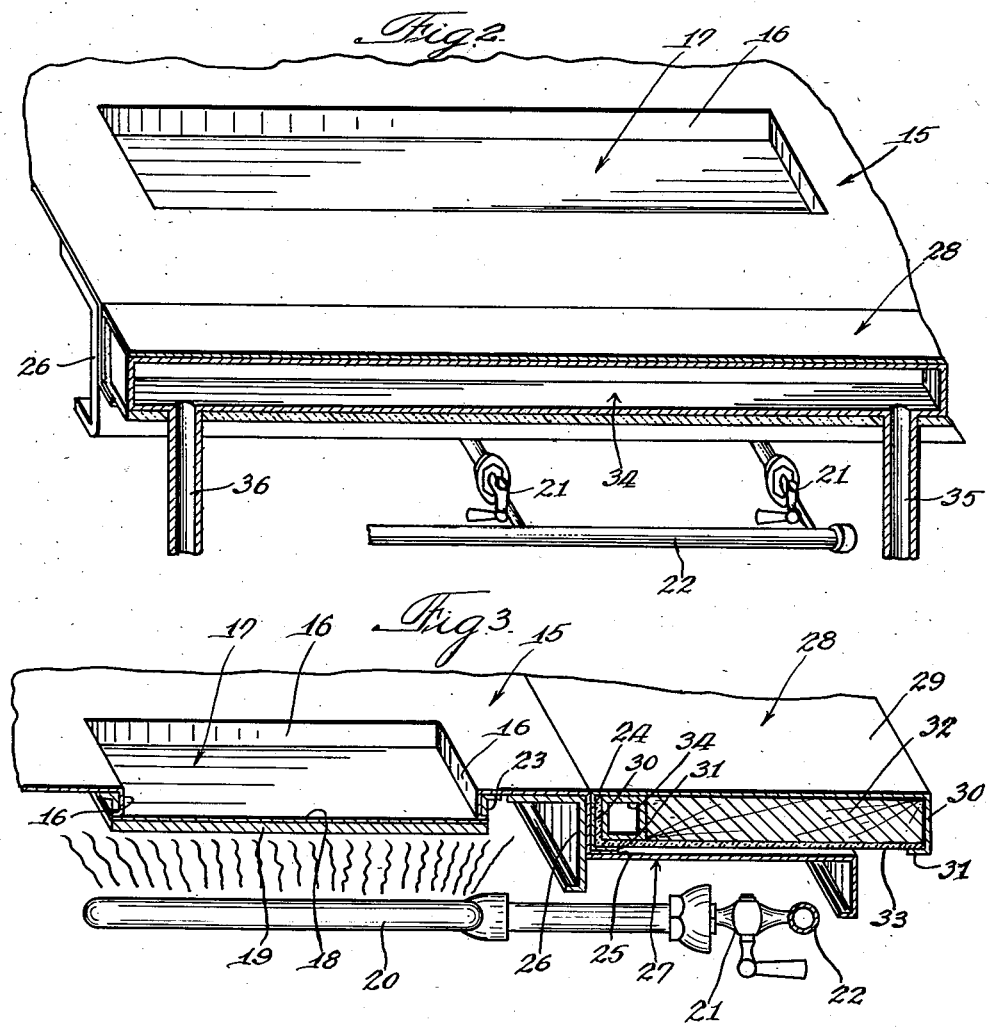

Patented Jan. 30, 1940

2,188,586

UNITED STATES PATENT OFFICE 2,188,586

COUNTER CONSTRUCTION

Franklin H. Wirtz, Columbus, Ohio, assignor to White Castle System, Inc., Columbus, Ohio, a corporation of Delaware Application April 28, 1938, Serial No. 204,709

10 Claims. (Cl. 126—37)

This invention relates to a counter construction and has special reference to a construction employing a hot plate, griddle, or the like, for frying, broiling, or otherwise heating foodstuffs in association with a means over which business is transacted such as the selling of hamburgers.

More particularly, this invention relates to a counter construction comprising a support for a hot plate, griddle, or the like, lying in a substantially horizontal plane with a shelf extending substantially horizontally therefrom, a cooling means being disposed in the shelf for absorbing heat transmitted from the hot plate, griddle, or the like, to prevent an undesired heating of the shelf adjacent which an operator stands in preparing foodstuffs and transacting business over the counter.

There is at the present time a demand for quick service at reasonable prices in the preparation of foodstuffs for the tourist trade and the hurried business and professional people. In order to care for the hurried demands of such a patronage it is necessary to have everything associated therewith readily accessible to an operator and, to minimize the expense of operation, it is found necessary that the construction over which the business is transacted occupy a minimum of space. Small buildings are constructed at outlying points on highways for tourist trade and on vacant lots in urban communities, while small spaces are acquired in the larger buildings of the more congested areas. In order to provide a maximum space for the care of the patrons in such restricted quarters, a very minimum of space is available for the operation of preparing and selling the foodstuffs.

In minimizing the space required for preparing the foodstuffs, certain difficulties have presented themselves which this invention contemplates remedying. Since the operator, in order to quickly supply the demand, must transact his business and operate upon the foodstuffs at the same point, it has been found desirable to provide a construction wherein the support for the hot plate, griddle, or the like, has a shelf extending substantially horizontally therefrom against which the operator rests when reaching to the serving table beyond the counter, and upon which the foodstuffs are prepared in, for example, the form of sandwiches.

In order to effect a maximum degree of sanitation it is very desirable to form the hot plate and the shelf of metal and preferably of stainless steel which is readily cleaned and which does not corrode or is otherwise chemically affected either by atmospheric conditions or the materials of the foodstuffs. However, metals for the most part are good conductors of heat and in resting against the counter in transacting business in front of the hot plate the transmission of heat from the hot plate to the shelf is uncomfortable to the operator.

The present invention contemplates the provision of a counter construction in which the surfaces worked upon are of all metal and the shelf is provided with a cooling means for absorbing heat transmitted from the hot plate to prevent an undesired heating of the shelf. Further, the cooling means, in absorbing heat transmitted from the hot plate, is used for other purposes about the place.

One of the objects of this invention is to provide a counter construction of the type hereinabove referred to which is comparatively inexpensive to manufacture, is easy to assemble, is durable, and provides for a maximum of sanitation.

Another object of this invention is to provide a counter construction of the type indicated above in which a cooling means is disposed in the shelf for absorbing heat transmitted from the hot plate, griddle, or the like, to prevent an undesired heating of the shelf.

Other objects and advantages of this invention will hereinafter be more particularly pointed out and, for a more complete understanding of the characteristic features of this invention, reference may now be had to the following description when taken together with the accompanying drawings, in which latter:

Figure 1 is a perspective view of a counter construction embodying the features of this invention and shown in association with a cabinet group;

Fig. 2 is an enlarged fragmentary sectional view in perspective taken on the line 2—2 of Fig. 1; and Fig. 3 is an enlarged fragmentary sectional view in perspective taken on the line 3—3 of Fig. 1.

Referring now more particularly to the drawings, the construction described as embodying the features of this invention is shown in association with a unit including a refrigerating cabinet 10 having material supplying cabinets 11 and 12, and a serving table 13 above the stand 14.

A support 15 is housed and carried by the stand 14 and the cabinets of the unit, and preferably comprises a sheet of stainless steel having an opening intermediate the length and width thereof with downwardly extending flanges 16 for supporting a plate 17. The plate 17 preferably comprises a plurality of sheets of steel of varying degrees of thermal conductivity, and as specifically shown comprises an upper sheet 18 of stainless steel facing the flanges 16 and a lower sheet 19 joined thereto of mild or boiler plate steel of substantially greater thickness. The lower sheet 19 faces a heating element 20 which, in the present instance, is shown as comprising a gas burner supplied through a pet cock 21 with gas from a gas inlet 22. The plate 17 is preferably welded or soldered to the flanges 16 across the opening in the support 15, the flanges 16 being preferably reinforced by angle irons 23 secured to the support 15 and the flanges 16.

The forward edge of the support 15 is bent downwardly as at 24 and then outwardly to provide the depending ledge 25. The corner formed by the depending ledge with the support 15 is reinforced and supported by a cross bar 26 of substantially channel shape and the outwardly extending ledge 25 is preferably supported by a bracket 27.

A shelf 28 extends substantially horizontally from the substantially horizontally extending support 15 and preferably comprises a metal plate 29 having depending skirts 30 which are bent inwardly toward each other to provide flanges 31. A wood base 32 is housed within the substantially channel-shaped construction of the shelf, an asbestos sheet 33 underlying the wood base 32 and extending thereagainst and upwardly along one of the depending skirts 30 on the inside thereof and on the inside of the flanges 31.

The wood base 32 engages the outer end of the metal envelope of the shelf and terminates short of the end of the shelf contiguous to the support 15 to provide a space extending across the shelf for the reception of a duct 34 through which a cooling medium may be passed.

As shown in Figs. 1 and 2, the duct 34 is at least as long as the width of the aperture of the support 15 and preferably is substantially longer. A cooling medium, such as water, is passed through an inlet pipe 35 from a source of supply to be conducted through the duct 34 to an outlet pipe 36 for connection with a reservoir. The duct 34 preferably contacts the plate 29 of the shelf and lies adjacent and in contact with the upturned end of the asbestos sheet, the bottom of the duct resting on the portion of the asbestos sheet extending beyond the end of the wood base 32. Being in contact with the metal plate 29 adjacent that portion which contacts with the depending skirt 24 of the support 15, whatever heat is transmitted from the hot plate 17 through the support 15 is absorbed by the cooling medium passing through duct 34 to prevent an undesired heating of the shelf 28.

In Fig. 1 it will be observed that the operator stands behind the shelf 28 in order to operate the hot plate or griddle 17 and that the serving table 13 extends a substantial distance in front of the hot plate or griddle so that in serving customers with sandwiches or other foodstuffs prepared on the hot plate and on the shelf 28, the operator will invariably rest against the outer edge of the shelf while reaching to the serving table.

In order to establish a maximum sanitation of those portions on which the foodstuffs are placed, the surfaces thereof are preferably formed of metal which is a good conductor of heat. Ordinarily the transmission of heat from the hot plate would cause substantial discomfort to the operator and a charring or otherwise undue wearing of the apparel of the operator. However, by reason of the cooling medium disposed adjacent the hot plate within the shelf such transmitted heat is absorbed so that an undesired heating of the shelf is prevented.

In employing water as a cooling medium, the absorbed heat is utilized in supplying heated water to a reservoir for other uses. In such an establishment serving the public, hot water is used for various purposes and while the water through the cooling system may not be sufficiently hot for a great number of purposes, it is at least pre-heated and therefore requires but a minimum of further heating before it may be used for all purposes.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. In a counter construction, a metal support for a hot plate, griddle, or the like, lying in a substantially horizontal plane, a shelf contiguous to and extending substantially horizontally therefrom, and a water duct in said shelf for absorbing heat transmitted from said hot plate, griddle, or the like, to prevent an undesired heating of said shelf.

2. In a counter construction, a support for a hot plate, griddle, or the like, lying in a substantially horizontal plane, a shelf contiguous to and extending substantially horizontally therefrom, said shelf including a metal plate overlying a wood base, and liquid cooling means in said shelf in engagement with said metal plate and wood base for absorbing heat transmitted from said hot plate, griddle, or the like, to prevent an undesired heating of said shelf.

3. In a counter construction, a metal support for a hot plate, griddle, or the like, having a supporting surface lying in a substantially horizontal plane, a shelf supported by said metal support and lying contiguous to said support, said shelf including a metal plate having a supporting surface coextensive with the supporting surface of said support, and liquid cooling means in said shelf for absorbing heat transmitted from said hot plate, griddle, or the like, to prevent an undesired heating of said shelf.

4. In a counter construction, a metal support for a hot plate, griddle, or the like, having a supporting surface lying in a substantially horizontal plane, a shelf supported by said metal support and lying contiguous to said support, said shelf including a metal plate having a supporting surface coextensive with the supporting surface of said support, and a water duct in said shelf in engagement with said metal plate and adjacent said metal support for absorbing heat transmitted from said hot plate, griddle, or the like, to prevent an undesired heating of said shelf.

5. In a counter construction, a metal support for a hot plate, griddle, or the like, having a supporting surface lying in a substantially horizontal plane, a shelf supported by said metal support and lying contiguous to said support, said shelf including a metal plate having a supporting surface coextensive with the supporting surface of said support and overlying a wood base, and a water duct in said shelf in engagement with said metal plate between said wood base and said metal support for absorbing heat transmitted from said hot plate, griddle, or the like to prevent an undesired heating of said shelf.

6. In a counter construction, a metal support for a hot plate, griddle, or the like, having a supporting surface lying in a substantially horizontal plane, a depending ledge extending from said support, a shelf supported by said ledge and lying contiguous to said support, said shelf including a metal plate having a supporting surface coextensive with the supporting surface of said support, and liquid cooling means in said shelf for absorbing heat transmitted from said hot plate, griddle, or the like, to prevent an undesired heating of said shelf.

7. In a counter construction, a metal support for a hot plate, griddle, or the like, having a supporting surface lying in a substantially horizontal plane, a depending ledge extending from said support, a shelf supported by said ledge and lying contiguous to said support, said shelf including a metal plate having a supporting surface coextensive with the supporting surface of said support, a wood base for said metal plate, and a water duct in contact with said metal plate between said wood base and said ledge for absorbing heat transmitted from said hot plate, griddle, or the like, to prevent an undesired heating of said shelf.

8. In a counter construction, a metal support for a hot plate, griddle, or the like, having a supporting surface lying in a substantially horizontal plane, a depending ledge extending from said support, a shelf supported by said ledge and lying contiguous to said support, said shelf including a metal plate having a supporting surface coextensive with the supporting surface of said support, a wood base for said metal plate, a water duct in contact with said metal plate disposed between said wood base and said ledge, and an asbestos sheet underlying said wood base and extending between said ledge and said water duct for absorbing heat transmitted from said hot plate, griddle, or the like, to prevent an undesired heating of said shelf.

9. In a counter construction, a metal support for a hot plate, griddle, or the like, having a supporting surface lying in a substantially horizontal plane, a depending ledge extending from said support, a shelf supported by said ledge and lying contiguous to said support, said shelf including a substantially channel-shaped metal plate having a supporting surface coextensive with the supporting surface of said support, a wood base housed in said channel-shaped metal plate, an asbestos sheet underlying said wood base and extending upwardly adjacent one edge of said channel-shaped metal plate adjacent said metal support, and a water duct between said upwardly extending portion of said asbestos sheet and the edge of said wood base for absorbing heat transmitted from said hot plate, griddle, or the like, to prevent an undesired heating of said shelf.

10. In a counter construction, a support for a hot plate, griddle, or the like, lying in a substantially horizontal plane, a shelf extending substantially horizontally therefrom, and a duct in said shelf for circulating a liquid cooling medium for absorbing heat transmitted from said hot plate, griddle, or the like, to prevent an undesired heating of said shelf.

FRANKLIN H. WIRTZ.